United States Patent Office 3,048,688
Patented Aug. 7, 1962

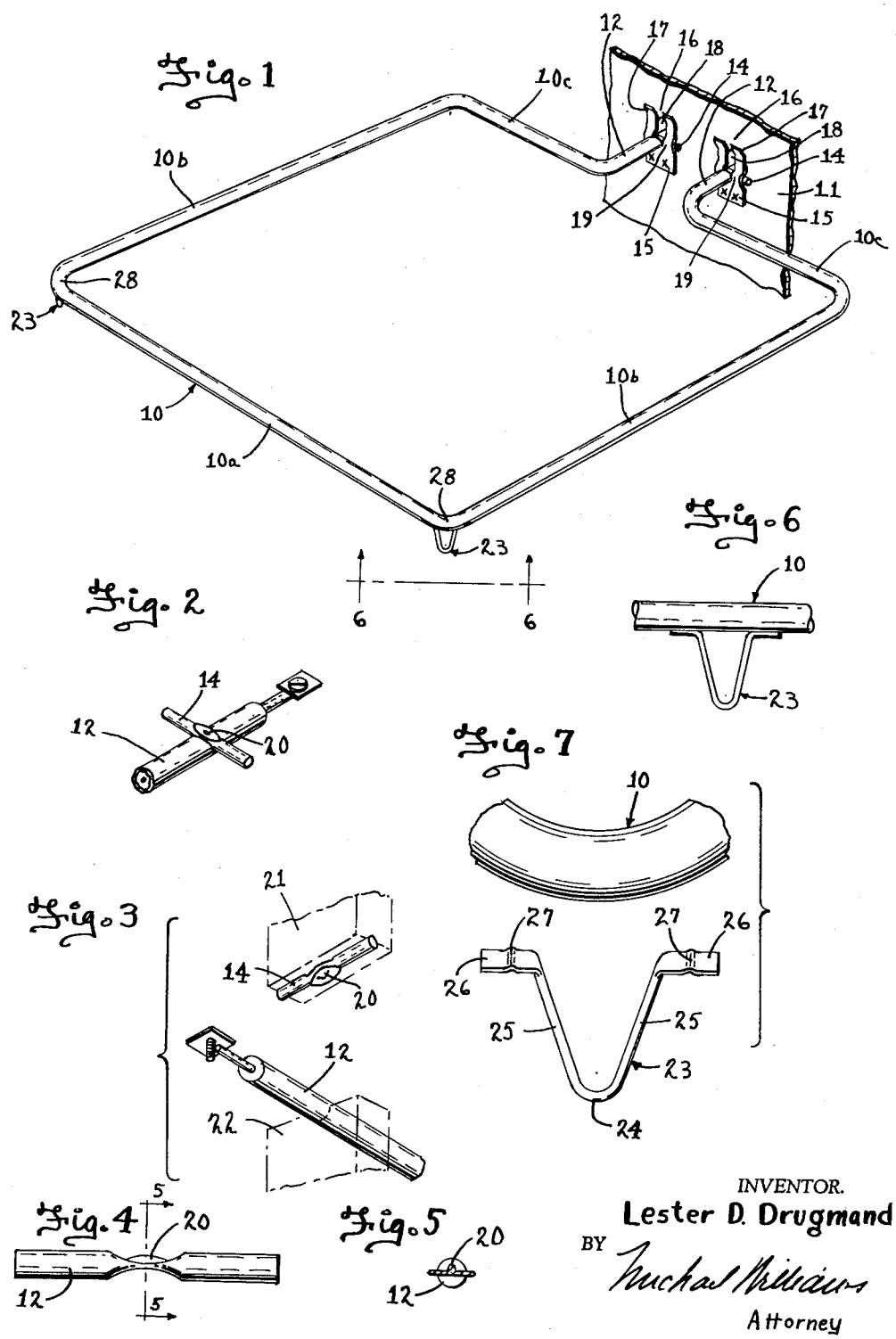

1

**3,048,688
ELECTRIC HEATING ELEMENTS**
Lester D. Drugmand, Pittsburgh, Pa., assignor to
Edwin L. Wiegand Company
Filed Aug. 22, 1958, Ser. No. 756,582
6 Claims. (Cl. 219—37)

This invention relates to electric heating elements and the principal object of this invention is to provide new and improved electric heating elements.

In the drawing accompanying this specification and forming a part of this application there are shown, for purposes of illustration, several embodiments which the invention may assume, and in this drawing:

FIGURE 1 is a perspective view of an electric heating element embodying the invention, a supporting wall being fragmentarily shown, FIGURE 2 is a broken perspective view of one embodiment of the invention, FIGURE 3 is a separated perspective view of parts illustrated in FIGURE 1, welding dies being shown in dot-dash lines, FIGURE 4 is an enlarged elevational view of one part shown in FIGURE 3, FIGURE 5 is a sectional view corresponding generally to the line 5—5 of FIGURE 4, FIGURE 6 is a fragmentary elevational view of another embodiment of the invention, and FIGURE 7 is a separated perspective view of the parts shown in FIGURE 6, the heating element being fragmentarily shown.

The electric heating element 10 for purposes of illustration, has been herein disclosed in the form of an oven element for heating the interior of an oven, a rear wall 11 of which is fragmentarily shown in FIGURE 1. Generally, the heating element may correspond to that disclosed in Wiegand Patent No. 2,272,282, in that a resistance conductor is disposed within an elongated metal tube and is embedded within compacted refractory material which serves to electrically insulate the resistance conductor from the metal tube and to conduct heat from the resistance conductor to the tube.

The heating element may be of rectilinear form, as shown in said patent, or it may be variously formed to suit specific requirements. Thus, as shown in FIGURE 1, the rectilinear element may be bent to a rectangular shape which is one shape used for oven elements wherein the active heating portion of the element is provided by sides 10a, 10b and partially by sides 10c. As also shown in FIGURE 1, the sides 10c have angular end portions 12 which in large part are non-heating portions of the heating element and constitute terminal portions from which terminals, connected to opposite ends of the resistance conductor, extend for connection to a suitable source of electrical energy.

It is usual to provide some means for supporting the electric heating element and this invention is particularly directed to the method of providing suitable support, and to the combination of means forming such support.

In certain installations, and particularly in oven installations, a part of the heating element, such as the terminal portions 12, is connected to a supporting wall. In the present disclosure, a supporting member is rigidly secured to the metal tube of the heating element and has engagement with a complementary part carried by the wall 11. More specifically, and as seen in FIGURES 1 through 5,

2 a cross-pin 14 is rigidly secured to each of the terminal portions 12 and fits within a respective supporting bracket 15 carried by the wall.

The supporting bracket 15 may be bifurcated, as shown, to provide an upwardly facing slot 16 defined by the furcations 17. The lower end of the brackets 15 may be suitably secured to the oven wall 11, as by welding, screws, or the like, and the furcations 17 may incorporate a certain amount of resiliency so that the cross-pins 14 may be interposed between the furcations and the oven wall 11, the slots 16 providing for passage of the terminal portions.

Usually, the oven wall 11 has elongated openings 18 for the passage of the ends of the terminal portions 12. The construction disclosed in FIGURE 1 lends itself well to providing a pivotal support for the heating element since the cross-pins provide ideal pivot pins and the oven wall openings 18 are elongated sufficiently to permit upright swinging movement of the ends of the terminal portions 12. To further enhance the connection between the cross-pins 14 and the brackets 15, the furcations 17 may be slightly bulged, as shown at 19, to provide recesses in which the cross-pins are removably seated.

Since the electric heating art is highly competitive, even a fractional savings is important because of the volume of production. The present invention, accordingly, is further directed to a secure, yet economical connection, between the cross-pins 14, or other supporting member, to the sheath or tube of the heating element. Electric resistance welding provides an ideal manner for effecting the foregoing assembly; yet because the sheath or tube of the heating element, customarily has a very thin wall, and efforts are constantly being made to further reduce the thickness of such wall because of a savings in metal and an increase in heating efficiency, the use of resistance welding was largely discouraged.

In present commercial practice, some electric heating elements, for example, include a sheath or tube of .315 inch outside diameter and a wall thickness of .025 inch, and it will be appreciated that considerable difficulty is encountered in resistance welding a supporting member to such tube.

It has been found, however, that special preparation of the supporting member will permit the use of resistance welding in commercial production. Of course, a first requirement is that the metal of the supporting member be compatible with the metal of the tube to permit such welding. The tubes are usually made of an alloy, such as Inconel. In the case of the cross-pin 14, it has been found that a soft temper, cold drawn stainless steel is suitable for the purpose, although it will be appreciated that the metals of the tube and cross-pin may be varied.

In the case of the cross-pin, it has been found preferable to coin both sides of the cold drawn pin to produce a localized projection 20 in a depressed area of the pin, the coining producing no distortion along the length of the pin except in the area of the projection, as shown in the drawing.

The cross-pin and a terminal portion 12 of the heating element are then disposed in a suitable fixture which may in part incorporate the welding dies, and the dies are brought together in known manner to press the projection 20 against the outer periphery of the sheath or tube while welding current is passed between the cross-pin and the tube. The projection 20 has its crest formed as sharp as possible and will therefore confine passage of welding current to a very small area so that the current may be held to a relatively small but sufficient amount necessary to produce a good weld without burning a hole in the tube. As the tip of the projection 20 softens under welding current, the welding dies 21, 22 will further close (it being understood that the welding machine used is preferably of the type having good follow-up characteristics) to fuse the projection to the tube wall.

It will be understood that both cross-pins 14 shown in FIGURE 1 may be welded to respective terminal portions 12 in one operation, if desired. Ordinarily, a mandrel would have to be inserted within a thin wall tube to support the latter against distortion caused by welding pressure, but in the present case it has been found that the compacted refractory material within the tube adequately backs up the tube to prevent undue distortion.

It is found desirable to provide a support for that portion of the electric heating element which is spaced from the support wall 11 and, in FIGURE 1, two feet 23, 23 are shown attached to the element and are adapted to bear against the bottom wall (not shown) of the oven.

In accordance with the teachings of this invention, the support feet may be resistance welded to the sheath or tube of the heating element in a manner similar to that before described.

Referring particularly to FIGURE 7 of the drawings, each support foot 23 is preferably of U-shape, or a modified U-shape, to provide a bight portion 24 adapted to engage the bottom wall of the oven and a pair of legs 25, 25 extending upwardly from the bight portion. The foot 23 may be made of a suitable metal alloy, such as Incaloy. Where the heating element tube is of .315 inch outside diameter and has a wall thickness of .024 inch, it has been found preferable to form the foot of about .093 inch diameter wire. The wire may be formed in any suitable manner to its U-shape and upper extremities of the legs 25 bent outwardly. As in the case of the cross-pin 14, the outwardly bent extremities are flattened to provide a web-like portion 26 having an upstanding rib 27.

Each foot 23 and the sheath or tube of the electric heating element may be placed in a fixture which, as before, may include the welding dies, and the dies are brought together to press the ribs 25, 25 against the outer periphery of the tube. Welding current is then passed between the foot 24 and the tube to fuse the ribs 27, 27 to the tube. Here again, the compacted refractory material provides an adequate back-up for the pressure exerted by the welding dies and thus prevents undue distortion of the tube.

It has been found that because of the intimate contact formed by welding the feet 23 to the heating element, these feet act as heat dissipating fins and cause the heating element to run at a slightly lower temperature in the area of the foot. In this respect, it is desirable to weld the support feet 23 at bend portions of the heating element, such as the portions 28 shown in FIGURE 1, since these portions may have a higher internal temperature gradient due to less dense refractory caused by the bending of the rectilinear tube. Since the supporting feet dissipate heat at these portions, they will have the effect of improving quality and service life of the heating element.

In view of the foregoing, it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. The combination of an electric heating element formed of a thin-wall metal tube in which is disposed an electric resistance conductor embedded in compacted refractory material for electrically insulating said conductor from said tube, with a U-shaped support for said heating element formed of a metal compatible with the metal of said tube for resistance welding purposes, each leg of said support having a flat laterally extending foot for welding connection to said tube and each foot having a rib abutted against and fused to outer surface of said tube, said ribs confining passage of welding current between said support and said outer surface to a limited area during the welding operation.

2. A mounting assembly for a sheathed electric heating element, comprising a cross-pin member connected to a terminal portion of said element, a support having an elongated opening freely passing the end of said terminal portion and permitting movement of said end within said opening, and a furcated bracket member secured to said support, the furcations defining a top opening slot for passing said terminal portion and providing spaced spring fingers for receiving the cross-pin member between them and the adjacent surface of said support, said spring fingers having bulged portions to receive said cross-pin and provide a pivotal mount therefor, and said spring fingers being normally biased toward said support to confine said cross-pin member but being retractable from said support to provide for assembly and disassembly of said cross-pin member.

3. The construction of claim 1 wherein said tube is elongated and is bent transversely to provide said element with a pair of generally rectilinear portions connected together by a bend portion and wherein said support is secured to said tube at said bend portion to act as a heat dissipating fin thereat to reduce the tendency of the resistance conductor at such bend portion to operate at a higher temperature than adjoining resistance conductor portions due to poorer material compaction at said bend portion.

4. The combination of an electric heating element formed of a metal tube in which is disposed an electric resistance conductor embedded in compacted refractory material for electrically insulating said conductor from said tube, with a support for said heating element, comprising an elongated member which is round in cross-section secured to said tube and said member having a widened portion for better engagement with said tube and a transverse projection located at said widened member portion, said projection abutting said tube and being resistance welded thereto and confining passage of welding current between said member and said tube to a limited area during welding thereof.

5. The combination of an electric heating element formed of a metal tube in which is disposed an electric resistance conductor embedded in compacted refractory material for electrically insulating said conductor from said tube, with a support for said heating element, comprising a pin secured to and extending crosswise of said tube and having an intermediate portion with a transverse deformation generally corresponding to the external transverse configuration of said tube and a projection located within said transverse deformation, said projection abutting said tube and being resistance welded thereto and confining passage of welding current between said pin and said tube to a limited area during welding thereof.

6. A mounting assembly for a sheathed electric heating element, comprising a pin connected crosswise of and to a terminal portion of said element, a support having an elongated opening freely passing the end of said terminal portion and permitting swinging movement of said end within said opening, and a furcated bracket secured to said support, the furcations defining a slot opening at a margin of said bracket and providing spaced spring fingers for receiving said pin between them and the adjacent surface of said support, said spring fingers being normally biased toward said support to confine said pin but being retractable from said support to provide for assembly and disassembly of said pin.

References Cited in the file of this patent

UNITED STATES PATENTS

| | | |
|---|---|---|
| 377,907 | Pell | Feb. 14, 1888 |
| 678,701 | Tuor | July 16, 1901 |
| 1,370,457 | Lincoln | Mar. 1, 1921 |
| 2,320,041 | McCormick | May 25, 1943 |
| 2,828,403 | Ammerman | Mar. 25, 1958 |
| 2,844,701 | Barnett | July 22, 1958 |
| 2,872,558 | Price | Feb. 3, 1959 |
| 2,875,313 | King | Feb. 24, 1959 |
| 2,918,560 | Kruse | Dec. 22, 1959 |